(12) United States Patent
Szubbocsev

(10) Patent No.: US 10,963,185 B2
(45) Date of Patent: Mar. 30, 2021

(54) MEMORY SUB-SYSTEM FOR PERFORMING WEAR-LEVELING ADJUSTMENTS BASED ON MEMORY COMPONENT ENDURANCE ESTIMATIONS

(71) Applicant: Micron Technology, Inc., Boise, ID (US)

(72) Inventor: Zoltan Szubbocsev, Haimhausen (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/196,113

(22) Filed: Nov. 20, 2018

(65) Prior Publication Data
US 2020/0159448 A1    May 21, 2020

(51) Int. Cl.
*G06F 3/06* (2006.01)
*G06F 12/02* (2006.01)

(52) U.S. Cl.
CPC ............ *G06F 3/0659* (2013.01); *G06F 3/064* (2013.01); *G06F 3/0616* (2013.01); *G06F 3/0679* (2013.01); *G06F 12/0246* (2013.01); *G06F 2212/7211* (2013.01)

(58) Field of Classification Search
None
See application file for complete search history.

(56) References Cited

U.S. PATENT DOCUMENTS

| 2010/0115192 A1 | 5/2010 | Lee |
| 2013/0138870 A1 | 5/2013 | Yoon et al. |
| 2013/0232289 A1 * | 9/2013 | Zhong ............... G06F 12/0246 711/102 |
| 2015/0293713 A1 | 10/2015 | Seo et al. |
| 2016/0062683 A1 | 3/2016 | Fontana et al. |
| 2016/0141029 A1 * | 5/2016 | Navon ............... G11C 13/0035 711/103 |
| 2016/0274802 A1 | 9/2016 | Koo et al. |

FOREIGN PATENT DOCUMENTS

KR    20180095468 A    8/2018

OTHER PUBLICATIONS

"International Application Serial No. PCT/US2019/061715, International Search Report dated Mar. 17, 2020", 3 pgs.
"International Application Serial No. PCT/US2019/061715, Written Opinion dated Mar. 17, 2020", 5 pgs.

* cited by examiner

*Primary Examiner* — Charles J Choi
(74) *Attorney, Agent, or Firm* — Schwegman Lundberg & Woessner, P.A.

(57) ABSTRACT

A system comprising a memory component including blocks, and a processing device, operatively coupled with the memory component. The processing device determines endurance values for the memory component. For each selected block of the plurality of blocks, the processing device determines an endurance estimation of the selected block based on at least one of a time to erase the selected block or an error statistic for the selected block, and updates an endurance value associated with the selected block based on the endurance estimation for the selected block. The processing device receives a write instruction to the memory component and distributes the write instruction to one or more of the blocks based on the endurance values. Other embodiments are described.

20 Claims, 4 Drawing Sheets

MEMORY SUB-SYSTEM FOR PERFORMING WEAR-LEVELING ADJUSTMENTS BASED ON MEMORY COMPONENT ENDURANCE ESTIMATIONS

TECHNICAL FIELD

Embodiments of the disclosure relate generally to memory sub-systems, and more specifically, relate to performing wear-leveling adjustments based on memory component endurance estimations.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
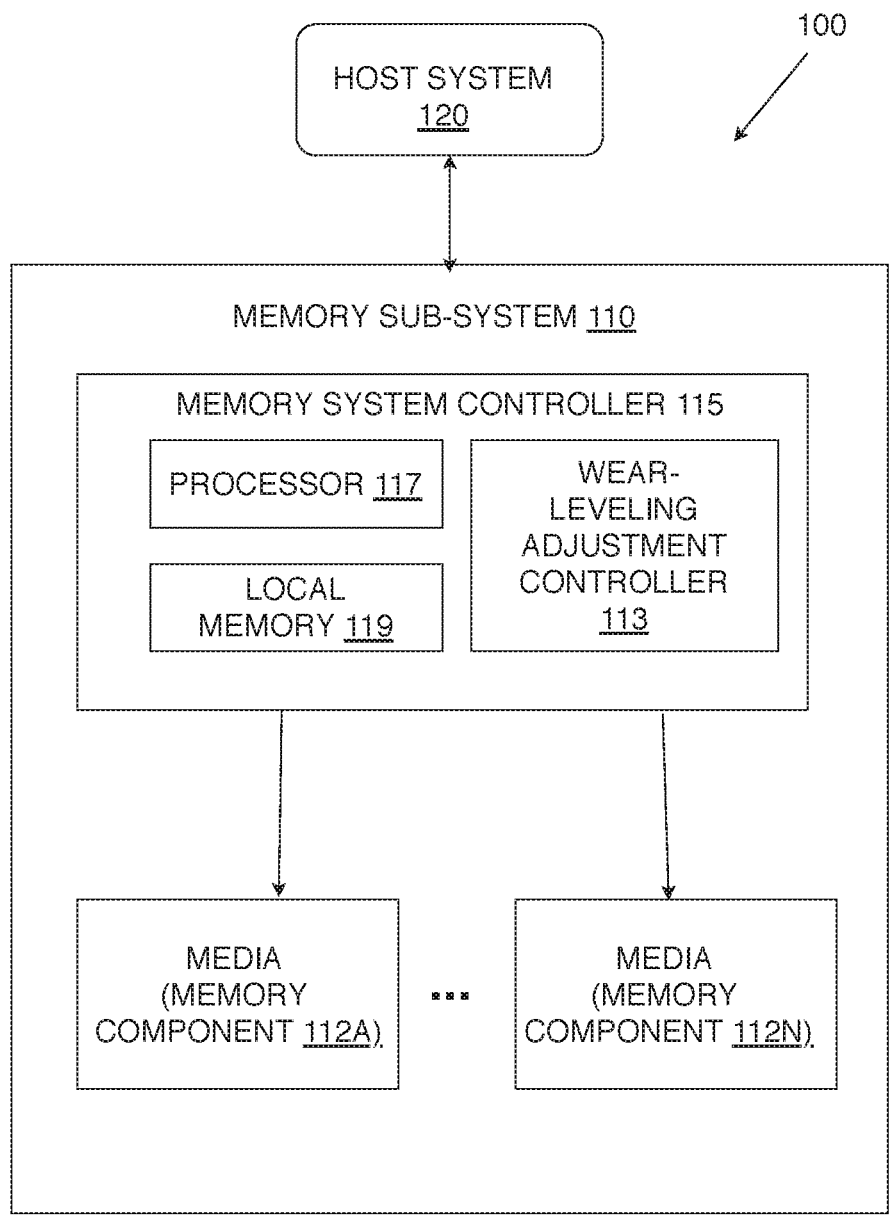
FIG. 1 illustrates an example computing environment that includes a memory sub-system in accordance with some embodiments of the present disclosure.

Aspects of the present disclosure are directed to performing wear-leveling adjustments based on memory component endurance estimations. A memory sub-system is also hereinafter referred to as a "memory device". An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. Each memory component can include a different type of media. Examples of media include, but are not limited to, non-volatile memory including flash-based memory or NAND memory. Each memory component includes thousands of blocks of storage space. For example, the NAND memory includes NAND blocks. Each block is composed of pages to which the memory sub-system can write data. In order to write data to a page, the entire block needs to be erased. The sequence of events in which data is written to a memory component, then erased and then rewritten is called a program-erase (P/E) cycle. A memory component can be erased only a set number of times before errors in the data written to, or read from, the memory component are expected. The life of a memory component can be characterized in P/E cycles.

In a conventional memory sub-system, the quality of the blocks in a memory component are assumed to be uniformly characterized by the P/E cycles. Accordingly, to quantify a memory component in P/E cycles, each block in the memory component is assessed to identify the block having been subjected to the most P/E cycles. This block is assumed to be the oldest block and is also assumed to have the least amount of endurance remaining. The memory component is then allocated that number of P/E cycles. In other words, the memory component's age is dictated by the oldest block (or block having the least amount of endurance remaining).

However, the blocks in the memory component can be non-uniform such that each block in the memory component may have a different level of resistance (e.g., endurance) to the same number of P/E cycles. In other words, some blocks can behave in a more or less robust manner.

Aspects of the present disclosure address the above and other deficiencies by having a memory sub-system that exploits the potential discrepancies in endurance of each of the blocks in the memory component. Such a memory sub-system estimates the endurance of a block based on time to erase and/or error statistics. By estimating the endurance of each block, a more precise quantification of the life of the blocks can be obtained. The memory sub-system can then perform wear-leveling using this more precise endurance metric of each block in the memory component. For example, the memory sub-system can uniformly distribute data to be stored to the blocks in the memory component based on the determined endurance of each block. This ensures that no single block goes beyond the targeted P/E cycle before other blocks in the memory component. For example, if a selected block in the memory component of the memory sub-system is at or near a usage threshold that indicates that the block is at or near a point where the block can no longer reliably store data, then data can be stored at another block of the memory component.

By estimating the endurance of each block, the wear (e.g., number of operations performed on a block in the memory component and/or an amount of data written to the block in the memory component) on the memory sub-system can be more evenly distributed, avoiding the premature failure of a particular block in the memory component relative to the other blocks in the memory component. Such a memory sub-system can thus maximize the lifetime of the memory component. Further, such a memory sub-system can fully exploit the write budget of the blocks in the memory components up to the error-correction code (ECC) correction capability.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is an SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another example embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear-leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a wear-leveling adjustment controller 113 that can determine the endurance values of blocks included in a memory component based on the endurance estimations for each of the blocks. The endurance value of a block represents the age or the endurance assigned to the block. Since each block in the memory component may have a different level of resistance (e.g., endurance) to the same number of P/E cycles, rather than quantifying the endurance value of the block merely based on the number of recorded P/E cycles the block has endured, the wear-leveling adjustment controller 113 uses an endurance estimation of the block to determine whether the number of recorded P/E cycles accurately represents the age or the endurance assigned to the block. As further described below, the endurance estimation can be based on the time to erase the block and/or the error statistics such as bit error rate. Using the endurance values for each of the blocks, the wear-leveling adjustment controller 113 can further perform wear-leveling adjustments. As illustrated in FIG. 1, the wear-leveling adjustment controller 113 can be included in the controller 115 of the memory sub-system 110. In some embodiments, the wear-leveling adjustment controller 113 is part of an application, or an operating system.

The wear-leveling adjustment controller 113 can determine an endurance estimation for each of the block included in memory components 112A to 112N of the memory sub-system 110. The wear-leveling adjustment controller 113 can update the endurance values associated with each of the blocks included in each of the memory components 112A to 112N. The endurance values can be updated based on the endurance estimation for each of the blocks. The wear-leveling adjustment controller 113 can receive a write instruction to one of the memory components 112A. The write instruction is then distributed to one or more of the blocks in the memory component 112A based on the endurance values of each of the blocks. Further details with regards to the operations of the wear-leveling adjustment controller 113 are described by way of example below. In one embodiment, the processor 117 is configured to execute instructions stored in local memory 119 that cause the wear-leveling adjustment controller 113 to perform these operations. Further details on the operations to perform wear-leveling adjustments based on memory component endurance estimations are discussed, by way of example, with reference to FIG. 2 and FIG. 3.

Figure 2:
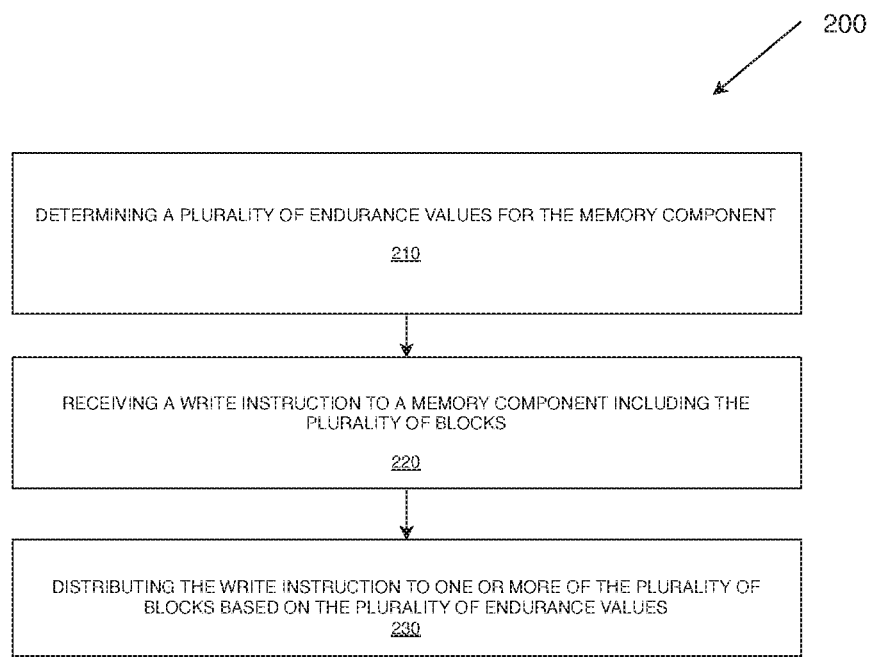
FIG. 2 is a flow diagram of an example method to perform wear-leveling adjustments based on memory component endurance estimations in accordance with some embodiments of the present disclosure.

FIG. 2 is a flow diagram of an example method 200 to perform wear-leveling adjustments based on memory component endurance estimations, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the wear-leveling adjustment controller 113 of FIG. 1. Although shown in a particular sequence or order, unless otherwise specified, the order of at least some of the operations can be modified. Thus, the illustrated embodiments should be understood only as examples, and the illustrated operations can be performed in a different order, and some operations can be performed in parallel. Additionally, one or more processes can be omitted in various embodiments. Thus, not all operations are required in every embodiment. Other process flows are possible.

At operation 210, the processing device determines a plurality of endurance values for the memory component (e.g., the memory component 112A) that includes a plurality of blocks. The plurality of blocks of the memory component 112A can be associated with a plurality of endurance values, respectively. Since the plurality of blocks of the memory component 112A are non-uniformly characterized by the actual P/E cycles, the endurance values associated with the blocks provide a better metric for the actual ages of the blocks. The endurance values can be the remaining endurances of the blocks and can be measured in P/E cycles. The processing device can determine at a predetermined time interval to perform the operation 210. For example, the predetermined time interval may be a set number of P/E cycles. In one example embodiment, the processing device determines the endurance values for the memory component 112A by performing the operations shown, by way of example, in more detail in FIG. 3, for each selected block of the plurality of blocks.

At operation 220, the processing device receives a write instruction to the memory component 112A that includes the plurality of blocks. At operation 230, the processing device distributes the write instruction to one or more of the plurality of blocks based on the plurality of endurance values. The processing device can maintain an approximate uniform usage of program erase cycles across the blocks in the memory component. In one embodiment, the processing device can maintain an approximate uniform usage of the P/E cycles across the blocks in a plurality of memory components 112A-112N in the memory sub-system 110. By considering the non-uniform wear of the blocks in memory components 112A-112N, the processing device can increase the memory components 112A-112N's lifetime by better distributing the write instructions based on the endurance of the blocks.

Figure 3:
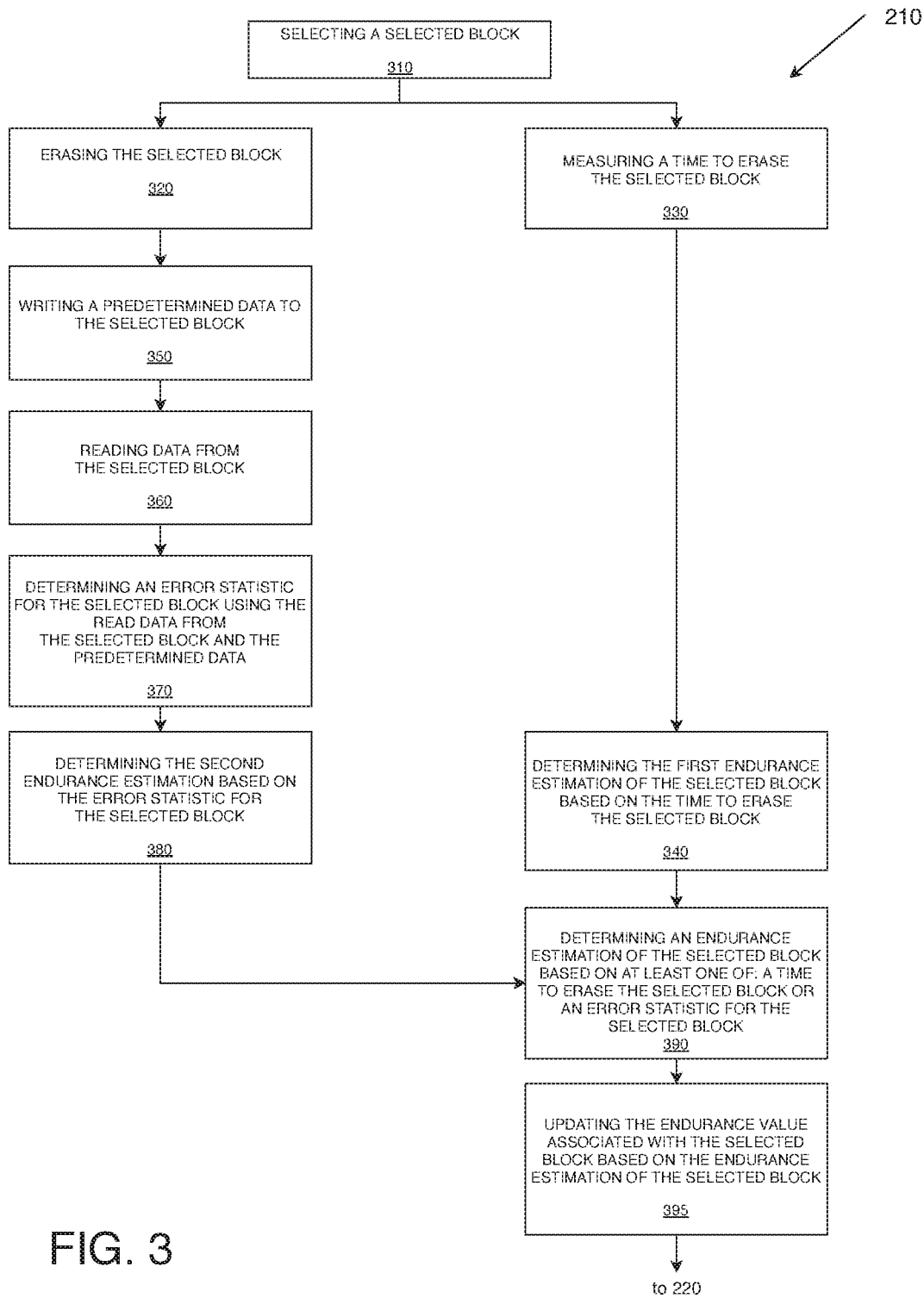
FIG. 3 is a flow diagram of determining endurance values for the memory component (operation 210 in FIG. 2) of the method to perform wear-leveling adjustments based on memory component endurance estimations in accordance with some embodiments of the present disclosure.

In FIG. 3, a flow diagram illustrates an example method of determining the endurance values for the memory component (operation 210 in FIG. 2) in accordance with some embodiments of the present disclosure.

In operation 310, the processing device selects the selected block of a plurality of blocks of a memory component, e.g., the memory component 112A. In operation 320, the processing device erases the selected block. In one embodiment, the processing device can erase the entirety of the selected block by erasing the data stored in the selected block.

Simultaneously with operation 320, the processing device measures a time to erase the selected block at operation 330. At operation 340, the processing device determines a first endurance estimation of the selected block based on the time taken to erase (or time to erase) the selected block. The time to erase the selected block carries information pertaining to the remaining endurance of the selected block. In this example embodiment, the processing device can build a statistical model that models the relationship between a distribution of the time to erase and the estimated remaining endurance for a particular error correction capability. In this embodiment, the processing device receives the time to erase the selected block as an input to the statistical model to obtain the first endurance estimation of the selected block.

In one embodiment, to compensate for any effect temperature can have on the time to erase the selected block, the processing device receives the temperature of the selected block when data is written to the selected block and receives the temperature of the selected block when processing device erases the selected block at operation 320. A temperature sensor measures the temperature of the selected block when data is written and when the processing device erases the selected block. The temperature sensor may be included on the memory component 112A including the selected block. The processing device may adjust first endurance estimation when there is a discrepancy between the temperatures.

In one embodiment, rather than the processing device measuring the time to erase the selected block at operation 320, the memory component 112A including the selected block can perform the duration calculation (i.e., measuring the time to erase the selected block). The memory component 112A can then transmits the time to erase the selected block to the processing device of the wear-leveling adjustment controller 113 at the request of the processing device.

As shown in FIG. 3, in one example embodiment, the processing device may perform operations 350-380 simultaneously as operation 340. In another embodiment, the processing device may perform operations 350-380 sequentially after operation 340. In another embodiment, the processing device may perform operation 340 sequentially after operations 350-380.

At operation 350, after erasing the selected block at operation 320, the processing device can write a predetermined data to the selected block. The predetermined data can be a known data pattern. At operation 360, the processing device reads data from the selected block. In one embodiment, the processing device immediately reads the data from the selected block at operation 360 after writing the predetermined data to the selected block in operation 350. At operation 370, the processing device determines an error statistic for the selected block using the read data from the selected block at operation 360 and the predetermined data. The error statistic can be, for example, a maximum number of errors in a code word per block, an average number of errors per code word, or a bit error rate. As a block ages, it will exhibit a greater maximum number of errors, a greater average number of errors or a greater bit error rate. Accordingly, an error statistic that indicates a greater number of errors or a greater bit error rate is indicative of a block that is older and thus, has less remaining endurance.

In one embodiment, rather than the processing device determining the error statistic of the selected block at operation 350, the memory component 112A including the selected block determines the error statistic for the selected block and transmits the error statistic for the selected block to the processing device of the wear-leveling adjustment controller 113 at the request of the processing device.

At operation 380, the processing device determines a second endurance estimation of the selected block based on the error statistic for the selected block. In one embodiment, to compensate for any effect temperature can exhibit on the error statistic, the processing device may receive the temperature of the selected block when processing device erases the block at operation 320 and may receive the temperature of the selected block when the processing device reads the data from the selected block at operation 360. A temperature sensor may measure the temperature of the selected block when processing device erases the block and the temperature of the selected block when the processing device reads the data from the selected block. The temperature sensor may be included in the memory component 112A that includes the selected block. The processing device may adjust second endurance estimation when there is a discrepancy between the temperatures.

At operation 390, the processing device determines the endurance estimation of the selected block based on at least one of: the first endurance estimation of the selected block or the second endurance estimation of the selected block. For example, while the selected block was actually erased 200 times (e.g., 200 P/E cycles), the selected block may correspond to a block that was erased only 100 times (e.g., 100 P/E cycles) according to the endurance estimation based on the erase time and/or the error statistic of the selected block.

In one embodiment, the processing device prioritizes the endurance estimation based on the time to erase the selected block over endurance estimation based on the error statistic for the selected block such that the processing device determines that the endurance estimation of the selected block is the first endurance estimation of the selected block.

In another embodiment, the processing device prioritizes the endurance estimation based on the error statistic of the selected block over endurance estimation based on the time to erase the selected block such that the processing device determines that the endurance estimation of the selected block is the second endurance estimation of the selected block.

In one embodiment, the processing device can determine that the greater of the first endurance estimation and the second endurance estimation is the endurance estimation of the selected block. In another embodiment, the processing device can determine that the lesser of the first endurance estimation and the second endurance estimation is the endurance estimation of the selected block. In one embodiment, the processing device can determine that the endurance estimation of the selected block is a weighted sum of the first endurance estimation and the second endurance estimation.

At operation 395, the processing device updates the endurance value associated with the selected block based on an endurance estimation of the selected block. In one example embodiment, the processing device generates a number of age groups equal to a number of wear-leveling groups. In this embodiment, to update the endurance value associated with the selected block in operation 395, the processing device determines a recorded number of P/E cycles associated with the selected block, determines a wear-leveling group associated with the recorded number of P/E cycles associated with the selected block, and determines an age group associated with the endurance estimation of the selected block. The processing device then determines whether the age group differs from the wear-leveling group and updates the endurance value associated with the selected block when the age group differs from the wear-leveling group. In one embodiment, when there is a mismatch between the age group and the wear-leveling group, the age group takes priority and the selected block's wear-leveling group is adjusted such that the processing device places the selected block in the wear-leveling group corresponding to the age group.

In one embodiment, the age groups are associated with erase time durations. In one embodiment, the age groups are associated with an error statistic (or rate) band. For example, the highest error rate band includes blocks considered the oldest whereas the lower error rate band includes blocks considered the youngest. In one embodiment, the processing devices determines the age groups using collected statistics on error statistics during host read operations or background read scans. In one embodiment, the processing device temperature compensates the age groups.

In one embodiment, the processing device repeats example process in FIG. 3 for each of the blocks in the memory component 112A to determine the endurance values for each of the blocks. The processing device may perform this example process in FIG. 3 at a predetermined interval of time. For example, the processing device can determine at the predetermined time interval to perform the process in FIG. 3. For example, the predetermined time interval may be a set number of P/E cycles.

Figure 4:
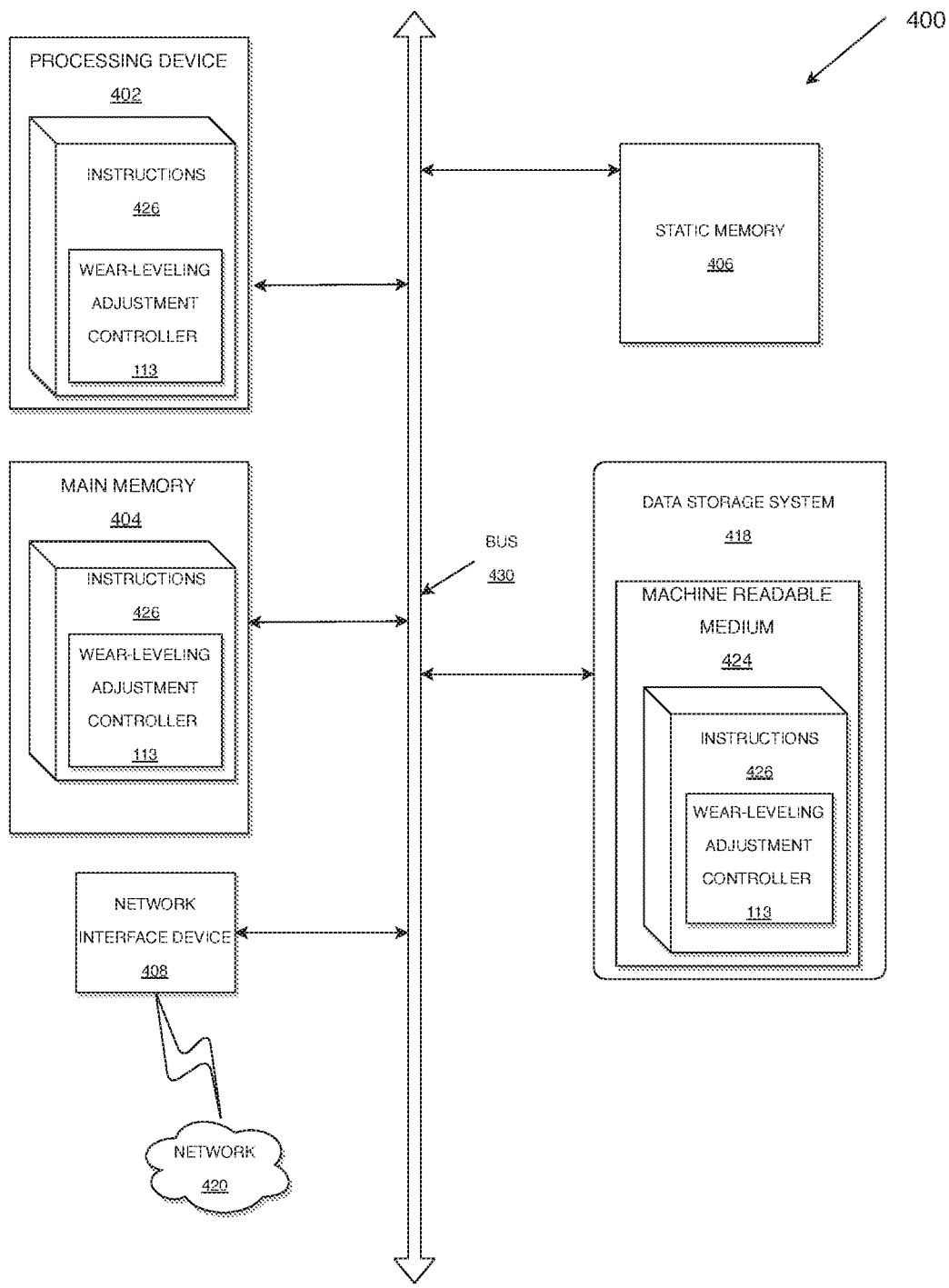
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the wear-leveling adjustment controller 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 500 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a wear-leveling adjustment controller (e.g., the wear-leveling adjustment controller 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs. EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component comprising a plurality of blocks; and
a processing device operatively coupled with the memory component, the processing device configured to perform operations comprising:
determining a plurality of endurance values for the memory component by performing, for each selected block of the plurality of blocks, operations comprising:
determining an endurance estimation of the selected block based on at least one of a time to erase the selected block or an error statistic for the selected block,
determining a first wear-leveling group associated with a recorded number of program-erase cycles associated with the selected block, a plurality of wear-leveling groups being associated with a plurality of recorded number of program-erase cycles, the plurality of wear-leveling groups comprising the first wear-leveling group and a second wear-leveling group,
determining a first age group associated with the endurance estimation of the selected block, a plurality of age groups being associated with a plurality of durations of time to erase or a plurality of error statistic bands, the plurality of age groups comprising the first age group, a number of age groups being equal to a number of wear-leveling groups, and the number of age groups and the number of wear-leveling groups being greater than two, and
in response to determining that the first age group differs from the first wear-leveling group,
updating an endurance value associated with the selected block based on the endurance estimation for the selected block,
determining that the first age group corresponds to the second wear-leveling group, and
associating the selected block with the second wear-leveling group;
receiving a write instruction to the memory component; and
distributing the write instruction to one or more of the plurality of blocks based on the plurality of endurance values.

2. The system of claim 1, wherein determining the plurality of endurance values for the memory component further comprises, for each selected block of the plurality of blocks, performing operations comprising:
erasing the selected block, and
measuring a time to erase the selected block.

3. The system of claim 1, wherein determining the plurality of endurance values for the memory component further comprises, for each selected block of the plurality of blocks, performing operations comprising:
erasing the selected block,
writing a predetermined data to the selected block,
reading data from the selected block, and
determining an error statistic for the selected block using the read data from the selected block and the predetermined data.

4. The system of claim 2, wherein determining the plurality of endurance values for the memory component further comprises, for each selected block of the plurality of blocks, performing operations comprising:
writing a predetermined data to the selected block,
reading data from the selected block, and
determining an error statistic for the selected block using the read data from the selected block and the predetermined data.

5. The system of claim 1, wherein the processing device configured to perform operations further comprises:
determining the recorded number of program-erase cycles associated with the selected block, and
determining whether the first age group differs from the first wear-leveling group.

6. The system of claim 1, wherein the error statistic is at least one of: a maximum number of errors in a code word per block, an average number of errors per code word, or a bit error rate.

7. The system of claim 1, wherein determining the endurance estimation of the selected block further comprises:
determining a first endurance estimation based on the time to erase the selected block,
determining a second endurance estimation based on the error statistic for the selected block, and
determining the endurance estimation of the selected block based on the first endurance estimation and the second endurance estimation.

8. The system of claim 7, wherein the endurance estimation of the selected block is one of:
a greater of the first endurance estimation and the second endurance estimation,
a lesser of the first endurance estimation and the second endurance estimation, or
a weighted sum of the first endurance estimation and the second endurance estimation.

9. A method comprising:
determining a plurality of endurance values for the memory component by performing, for each selected block of the plurality of blocks, operations comprising:
determining an endurance estimation of the selected block based on at least one of a time to erase the selected block or an error statistic for the selected block,
determining a first wear-leveling group associated with a recorded number of program-erase cycles associated with the selected block, a plurality of wear-leveling groups being associated with a plurality of recorded number of program-erase cycles, the plurality of wear-leveling groups comprising the first wear-leveling group and a second wear-leveling group, determining a first age group associated with the endurance estimation of the selected block, a plurality of age groups being associated with a plurality of durations of time to erase or a plurality of error statistic bands, the plurality of age groups comprising the first age group, a number of age groups being equal to a number of wear-leveling groups, and the number of age groups and the number of wear-leveling groups being greater than two, and in response to determining that the first age group differs from the first wear-leveling group,
updating an endurance value associated with the selected block based on the endurance estimation for the selected block,
determining that the first age group corresponds to the second wear-leveling group, and
associating the selected block with the second wear-leveling group;

receiving a write instruction to the memory component; and distributing the write instruction to one or more of the plurality of blocks based on the plurality of endurance values.

10. The method of claim 9, wherein determining the plurality of endurance values for the memory component further comprises, for each selected block of the plurality of blocks, performing operations comprising:
erasing the selected block, and
measuring a time to erase the selected block.

11. The method of claim 9, wherein determining the plurality of endurance values for the memory component further comprises, for each selected block of the plurality of blocks, performing operations comprising:
erasing the selected block,
writing a predetermined data to the selected block,
reading data from the selected block, and
determining an error statistic for the selected block using the read data from the selected block and the predetermined data.

12. The method of claim 10, wherein determining the plurality of endurance values for the memory component further comprises, for each selected block of the plurality of blocks, performing operations comprising:
writing a predetermined data to the selected block,
reading data from the selected block, and
determining an error statistic for the selected block using the read data from the selected block and the predetermined data.

13. The method of claim 9, further comprising:
determining the recorded number of program-erase cycles associated with the selected block, and
determining whether the first age group differs from the first wear-leveling group.

14. The method of claim 9, wherein the error statistic is at least one of: a maximum number of errors in a code word per block, an average number of errors per code word, or a bit error rate.

15. The method of claim 9, wherein determining the endurance estimation of the selected block further comprises:
determining a first endurance estimation based on the time to erase the selected block,
determining a second endurance estimation based on the error statistic for the selected block, and
determining the endurance estimation of the selected block based on the first endurance estimation and the second endurance estimation.

16. The method of claim 15, wherein the endurance estimation is one of:
a greater of the first endurance estimation and the second endurance estimation,
a lesser of the first endurance estimation and the second endurance estimation, or
a weighted sum of the first endurance estimation and the second endurance estimation.

17. At least one machine-readable storage medium comprising instructions that, when executed by a processing device, cause the processing device to perform operations comprising:
determining a plurality of endurance values for the memory component by performing, for each selected block of the plurality of blocks, operations comprising:
determining an endurance estimation of the selected block based on at least one of a time to erase the selected block or an error statistic for the selected block,
determining a first wear-leveling group associated with a recorded number of program-erase cycles associated with the selected block, a plurality of wear-leveling groups being associated with a plurality of recorded number of program-erase cycles, the plurality of wear-leveling groups comprising the first wear-leveling group and a second wear-leveling group,
determining a first age group associated with the endurance estimation of the selected block, a plurality of age groups being associated with a plurality of durations of time to erase or a plurality of error statistic bands, the plurality of age groups comprising the first age group, a number of age groups being equal to a number of wear-leveling groups, and the number of age groups and the number of wear-leveling groups being greater than two, and
in response to determining that the first age group differs from the first wear-leveling group,
updating an endurance value associated with the selected block based on the endurance estimation for the selected block,
determining that the first age group corresponds to the second wear-leveling group, and
associating the selected block with the second wear-leveling group;
receiving a write instruction to the memory component; and
distributing the write instruction to one or more of the plurality of blocks based on the plurality of endurance values.

18. The at least one machine-readable storage medium of claim 17, wherein determining the plurality of endurance values for the memory component further comprises, for each selected block of the plurality of blocks, performing operations comprising:
erasing the selected block, and
measuring a time to erase the selected block.

19. The at least one machine-readable storage medium of claim 17, wherein determining the plurality of endurance values for the memory component further comprises, for each selected block of the plurality of blocks, performing operations comprising:
erasing the selected block,
writing a predetermined data to the selected block, reading data from the selected block, and determining an error statistic for the selected block using the read data from the selected block and the predetermined data.

20. The at least one machine-readable storage medium of claim 18, wherein determining the plurality of endurance values for the memory component further comprises, for each selected block of the plurality of blocks, performing operations comprising:

writing a predetermined data to the selected block, reading data from the selected block, and determining an error statistic for the selected block using the read data from the selected block and the predetermined data.

* * * * *